May 2, 1933.    J. M. THOMPSON    1,906,726
HYDRAULIC TRANSMISSION
Filed Nov. 19, 1930    8 Sheets-Sheet 1

Fig.1.

John Marvin Thompson
INVENTOR
BY Victor J. Evans
ATTORNEY

Fig. 2.

May 2, 1933.  J. M. THOMPSON  1,906,726
HYDRAULIC TRANSMISSION
Filed Nov. 19, 1930   8 Sheets-Sheet 7

John Marvin Thompson
INVENTOR
BY Victor J. Evans
ATTORNEY

May 2, 1933.  J. M. THOMPSON  1,906,726
HYDRAULIC TRANSMISSION
Filed Nov. 19, 1930   8 Sheets-Sheet 8

John Marvin Thompson
INVENTOR
BY Victor J. Evans
ATTORNEY

Patented May 2, 1933

1,906,726

UNITED STATES PATENT OFFICE

JOHN MARVIN THOMPSON, OF RALEIGH, NORTH CAROLINA

HYDRAULIC TRANSMISSION

Application filed November 19, 1930. Serial No. 496,745.

This invention relates to a hydraulic transmission, the general object of the invention being to provide pump means driven from the drive shaft for forcing fluid to a series of cylinders to cause the pistons of said cylinders to impart rotary movement to the driven shaft or member, with means for adjusting the strokes of the pistons to regulate the speed at which the driven member is actuated from the drive member, such means also enabling the parts to be placed in a neutral position, whereby the driven member will be free of the drive member so that the drive member can rotate without imparting motion to the driven member.

A further object of the invention is to provide reversing means whereby the driven member will be rotated in a reverse direction from the drive member, with means for causing the device to act as a brake.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

In these drawings, the numeral 10 indicates the housing of the apparatus which is provided with the cooling fins 11 and the numeral 12 indicates the drive shaft extending into one end of the housing and the numeral 13 indicates the driven shaft extending into the other end of the housing. A head 14 is connected with the inner end of the drive shaft and a spherical member 15 is connected with the inner end of the driven shaft. This member 15 is provided with a base 16 which is fastened to the rear end of a cylinder housing 17 and a spherical member 18 has its base 19 connected with the front end of the cylinder housing. The spherical member 18 has a trunnion 20 thereon which is rotatably arranged in a bearing recess in the head 14 of the drive shaft. Anti-friction thrust bearings 21 are arranged in the recess and are engaged by the end of the trunnion and anti-friction bearings 22 are provided for the inner parts of the drive and driven shafts.

Thus the spherical member 15, the cylinder housing 17 and the spherical member 18 are all connected with the driven shaft.

A pump chamber 23 of annular formation is located at the forward end of the housing 17 and a pump chamber 24 is located at the front end of the main housing 10. An impeller 25 is connected with the head 14 and acts to pump oil or other fluid in the main housing 10 through a conduit 26 which delivers the fluid into the pump chamber 23. This chamber is in communication with the main housing through the opening 27 and the fluid is introduced into the main housing through means of the inlet 28 closed by a plug 29 and a sediment chamber 30 is provided for the housing 10, said chamber being provided with a drain opening which is closed by a plug 31.

Curved arms 32 are connected with the head 14 and have their rear ends extending into the pump chamber 23, where the arms are provided with the blades 33 for pumping the oil from the chamber 23 through the passages 34 into the pump cylinders 35 arranged in the cylinder housing 17 and having their forward ends opening out through the forward end of the cylinder housing. A ring member 36 is supported for rocking movement by the arms 32 through means of the trunnions 37 on the ring member engaging bearing openings in the arms and said ring member surrounds the spherical member 18 and is so formed that it can rotate around said spherical member and also be rocked on its trunnions without interference from said spherical member. A sleeve 38 surrounds the ring member 36 and has internal grooves 39 through which the arms 32 pass and said sleeve is formed with a longitudinally extending internal rack 40, the teeth of which engage the teeth 41 on a part of the ring member 36. A second sleeve 42 surrounds the sleeve 38 and the sleeve 38 is rotatably arranged in the sleeve 42 through means of the front and rear anti-friction means 43, the rear means engaging an annular shoulder 44 formed on the second sleeve 42 and the front anti-friction means engaging a nut 45 which is threaded in the front end of the sleeve 42. Thus the sleeve 38 is rotatably carried by the sleeve 42 and is caused to move longitudinally with said sleeve 42. This longitudinal movement is imparted to the sleeve 42 through the ring gear 46 having its internal circumference shaped to engage the spiral threads 47 on the outer circumference of the sleeve 42, this gear being arranged in a groove 48 in the housing 10 and having its exterior teeth engaged by a gear 49 carried by a shaft 50 journaled in the housing and manually rotated through means of a rack 51 engaging a pinion 52 formed with the gear 49. The rack is arranged in a guideway 53 formed on the housing 10 and has a handle 54 thereon so that it can be reciprocated to impart movement to the shaft 50 and its gear 49, the gear 49 in turn imparting rotary movement to the ring gear 46 and this rotary movement of the ring gear imparts a longitudinally movement to the sleeve 42 which carries the sleeve 38. This longitudinal movement of the sleeve 38 will cause its rack 40, engaging the teeth 41, to rock the ring member 36 on its trunnions. As the ring member 36 has its trunnions carried by the arms 32 and these arms are connected with the drive shaft, it will be seen that the ring member 36 and the sleeve 38 rotate with the drive shaft.

The inner circumference of the ring member 36 is formed with an annular groove 55 and the spherical member 18 is formed with a pair of slots 56 which are arranged at right angles to each other. A cross bar 57 passes through each slot and has its ends of cylindrical shape to receive the caps 58 which are located in the groove 55. A piston 59 is arranged in each cylinder 35 and connecting rods 60 connect the pistons with the cross bars 57, each pair of pistons being connected with a cross bar, with the connections of the rods 60 located adjacent the ends of the cross bars. Thus when the ring member 36 is tilted on its trunnions, the rotary movement of said ring will impart a rocking movement to the cross bars 57 and this movement will cause the pistons 59 to reciprocate in the cylinders 35. Of course, if the ring member 36 is placed in a position where its groove 50 lies in a plane at right angles to the drive shaft, the rotary movement of the ring member 36 will not rock the bars 57 so that the pistons 59 will not be reciprocated.

A second set of cylinders 61 is arranged in the housing 17 and these cylinders open out through the rear end of the housing. A piston 62 is located in each cylinder 61 and the rear end of each piston is formed with an offset forked extension 63, the prongs of which are formed with the elongated eyes or openings 64. The extensions 63 of the pistons 62 project into slots 65 arranged at right angles to each other in the spherical member 15 and cross bars 66 pass through these slots. Pins 67 are carried by the cross bars 66 on which are arranged rollers 68 which engage the walls of the openings 64 so that the reciprocatory movement of the pistons 62 will rock the bars 66. The ends of the bars 66 carry the caps or rollers 69 which are located in a channel shaped ring 70 which surrounds the spherical member 15 and is supported for rocking movement in the rear end of the housing 10 through means of the oppositely arranged trunnions 71 on the ring engaging bearing parts 72 formed in the housing. Thus the rocking movement imparted to the bars 66 by the reciprocatory action of the pistons 62 will cause the rollers 69 at the ends of the bars 66 to exert pressure against the channel-shaped ring 70 and as said ring is held stationary, this pressure will result in causing the spherical member 15 and the parts connected therewith to rotate.

An arm 73 has its rear end curved and pivotally connected with the ring 70, as shown at 74. The other end of the arm is pivotally connected by a pin 75 to a link 76 pivotally arranged on a shaft 77 journaled in the top of the main housing and a link 78 has its upper end pivotally connected with the pin 75 and its lower end is pivotally connected to the brackets 79 which are connected with the sleeve 42 so that when the sleeve 42 is moved longitudinally, this movement is imparted to the ring 70 by the arm 73 and the link 78, though the movement of the ring 70 is less than the rocking movement imparted to the member 36 by the adjustment of the sleeve 42, due to the link arrangement 76 and 78. These parts are so arranged that when the angle of the ring member 36 is increased, the angle of the ring 70 is decreased and vice versa.

Each piston of each set of pistons is formed with a reduced intermediate part 80 to form an annular space in each cylinder between the two end portions of the piston so that the pistons also form valve means, as will be hereinafter described.

Figure 21:
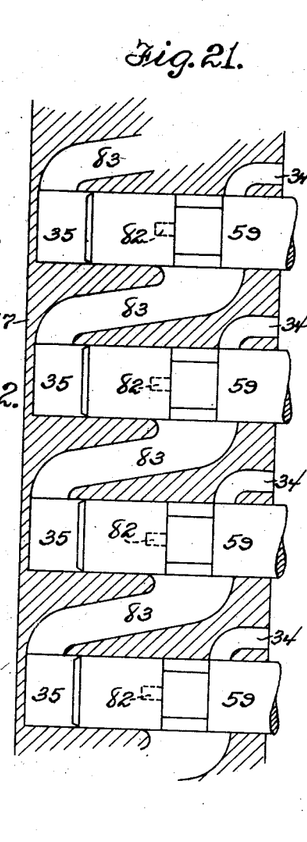
Figure 21 is a diagrammatic view of the pump cylinders and pistons.

A small cylinder 81 is formed at the center of the cylinder housing 17 and has its ends opening out into spaces in the housing 17, said housing having openings so that the fluid in the main housing can enter the housing 17 and enter the passages therein which are so arranged as to cause the fluid to cool the cylinders in the housing. A port 82 connects each cylinder 35 with the small cylinder 81, these ports being arranged substantially midway the ends of the cylinders and passages 83 connect an intermediate portion of each cylinder 35 with the closed or rear end of an adjacent cylinder 35, these passages 83 being of curved shape, as shown in Figure 21. Similar passages 84 connect an intermediate portion of each cylinder 61 with the closed end of an adjacent cylinder 61. A port 85 connects each of the cylinders 61 with the rear part of the small cylinder 81 and a curved passage 86 connects each of the cylinders 61 with a forward part of the small cylinder 81. A stem 87 extends into the small cylinder 81 from the rear end thereof and carries the valves 88 and 89, these valves being so arranged that in one position of the stem, the passages 85 are in communication with the ports 82 and the passages 86 are cut off from said ports 82. In another position of the stem, the valves will cut off the passages 85 from the ports 82 and place the ports 86 in communication with the ports 82. A spider 90 is arranged in the rear part of the housing 17, with its spokes passing through openings 91 in the housing 17, with the rim 92 of the spider slidingly engaging the exterior walls of the housing 17. The central part of the spider is connected with the stem 87, as shown at 93. An arm 94 is slidably arranged in the brackets 95 in the housing 10 and has a notch 96 therein for receiving a part of the rim of the spider. This arm has its forward end pivotally connected by a link 94' to an arm 97 fastened to the shaft 77 and a hand lever 98 is fastened to the shaft and extends from the housing 10 so that by moving this lever, the arm 94 is manipulated to cause the spider to move the valve stem to adjust the valves 88 and 89.

Figure 2:
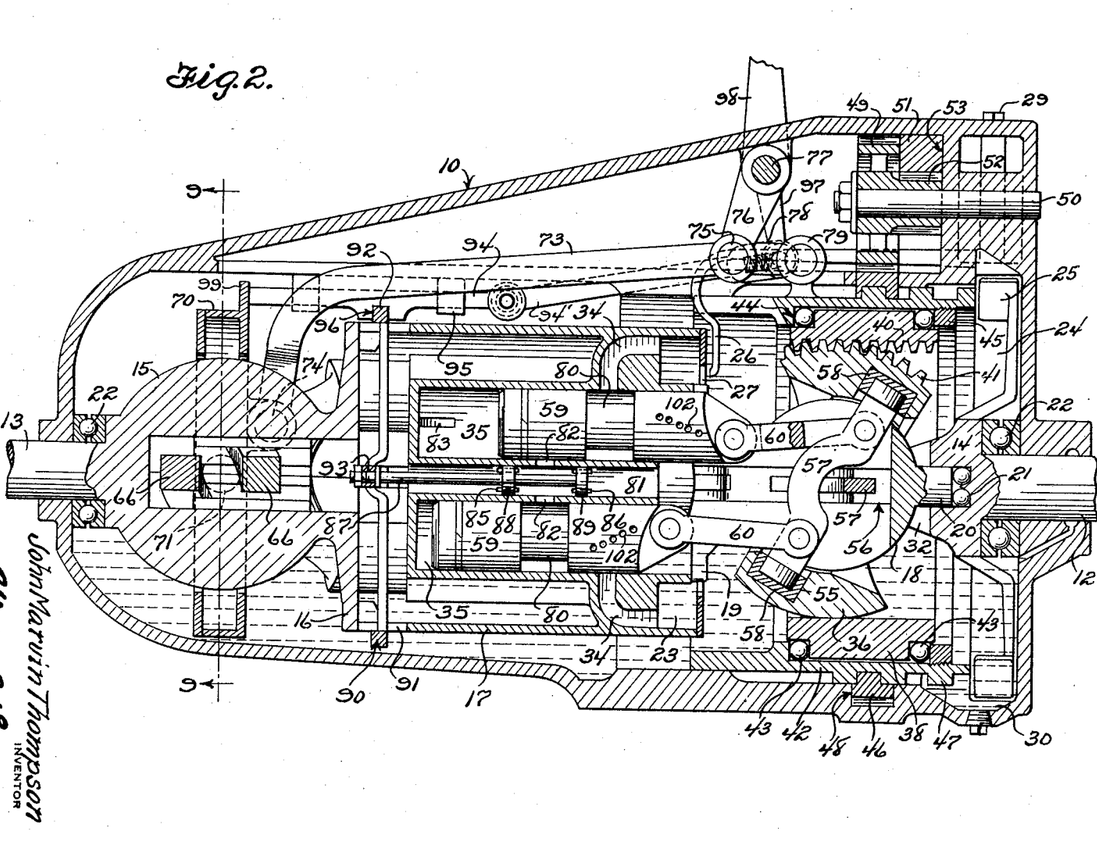
Figure 2 is a similar view with the parts arranged for direct drive excepting that the valve structure is shown in neutral.
Figure 3:
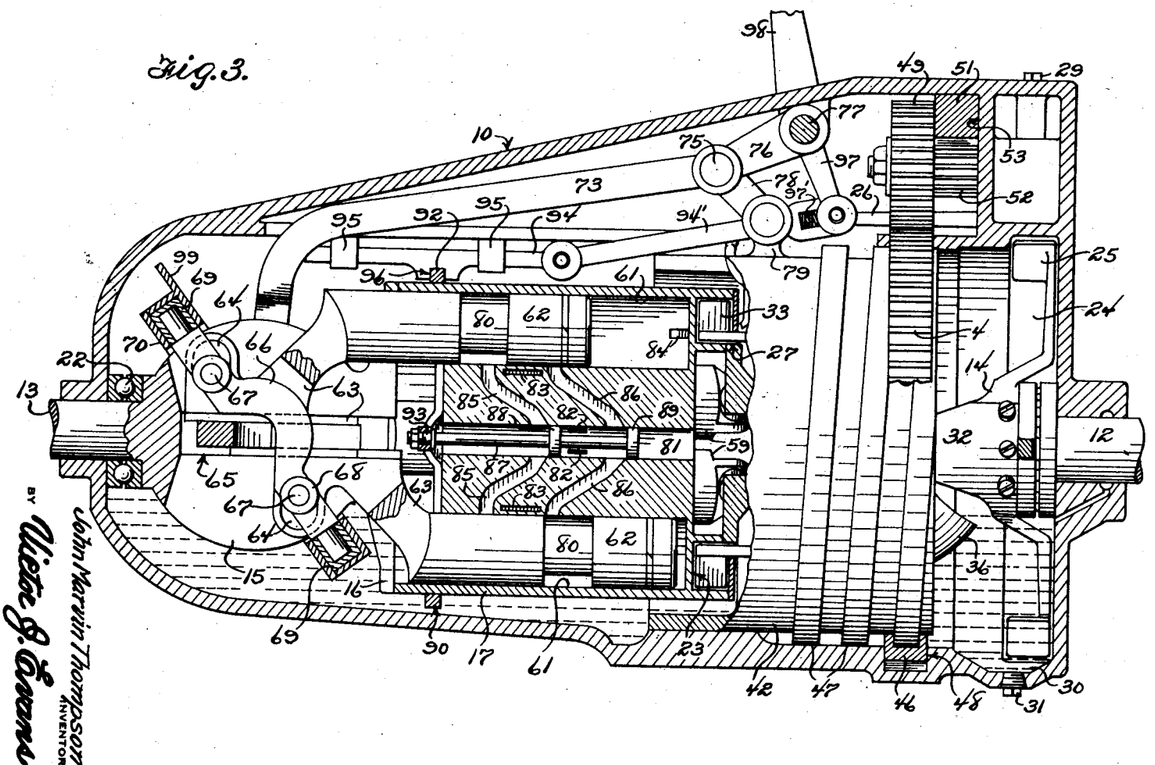
Figure 3 is a view similar to Figure 1, but showing some of the interior parts in elevation and some in section.
Figure 4:
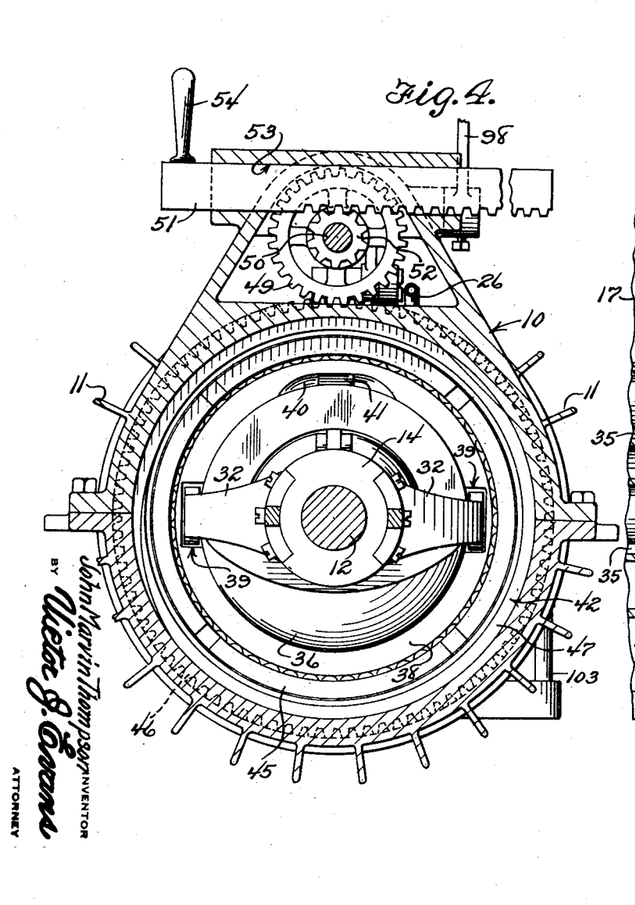
Figure 4 is a section on line 4—4 of Figure 1.
Figure 5:
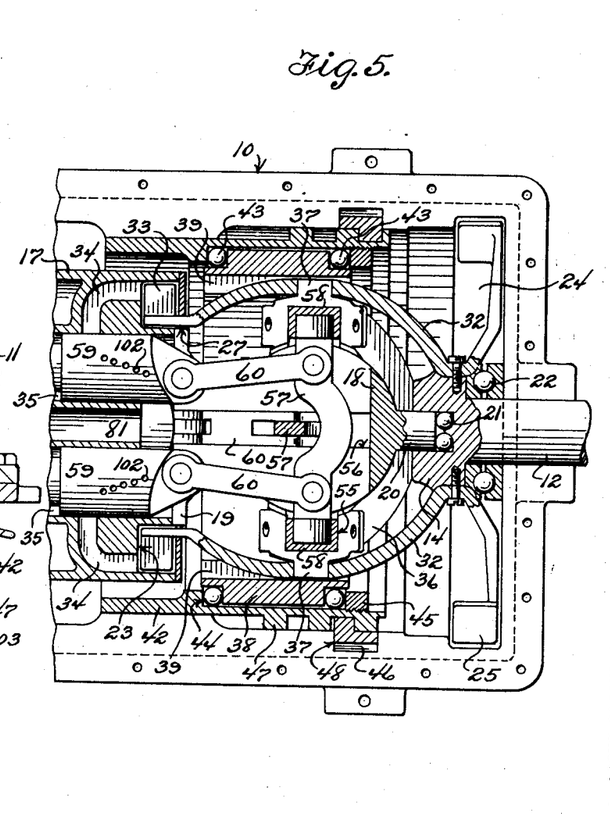
Figure 5 is a section on line 5—5 of Figure 1.
Figure 6:
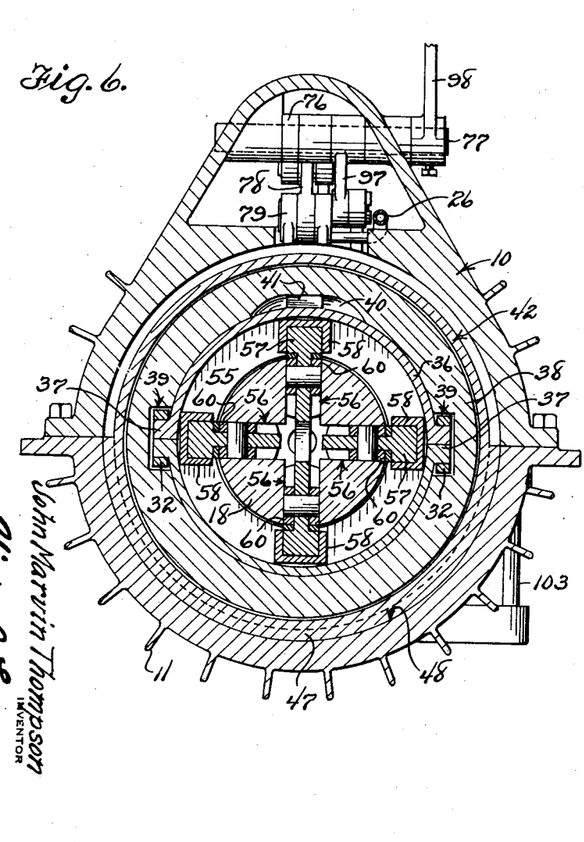
Figure 6 is a section on line 6—6 of Figure 1.
Figure 7:
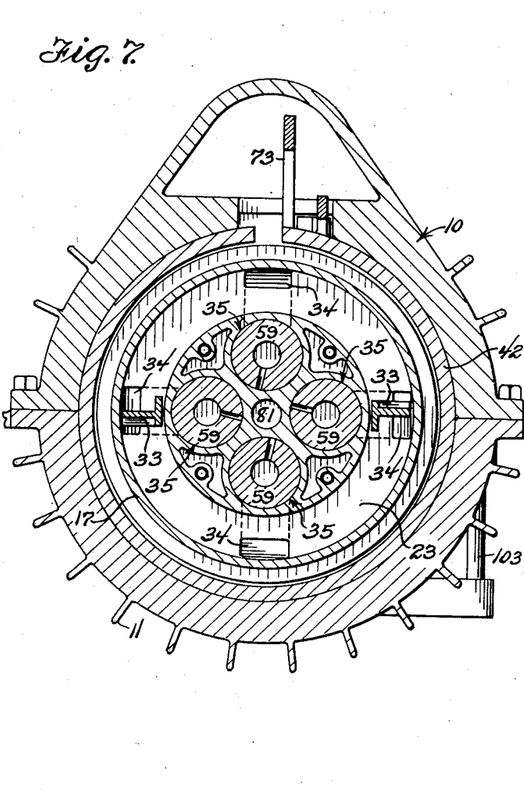
Figure 7 is a section on line 7—7 of Figure 1.
Figure 8:
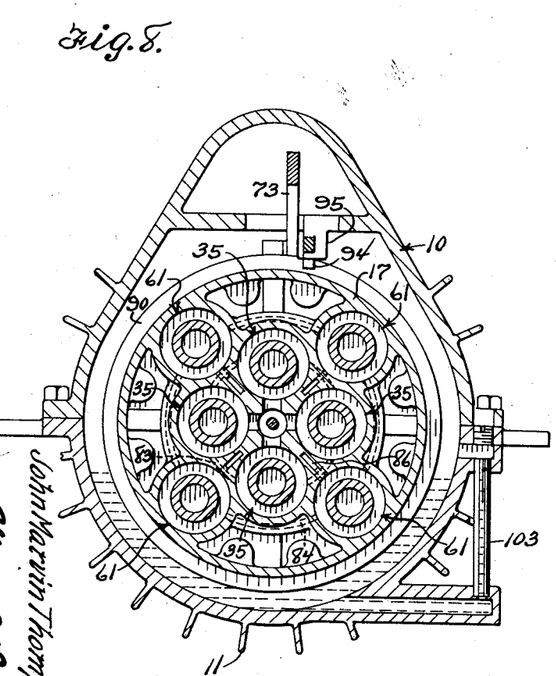
Figure 8 is a section on line 8—8 of Figure 1.
Figure 9:
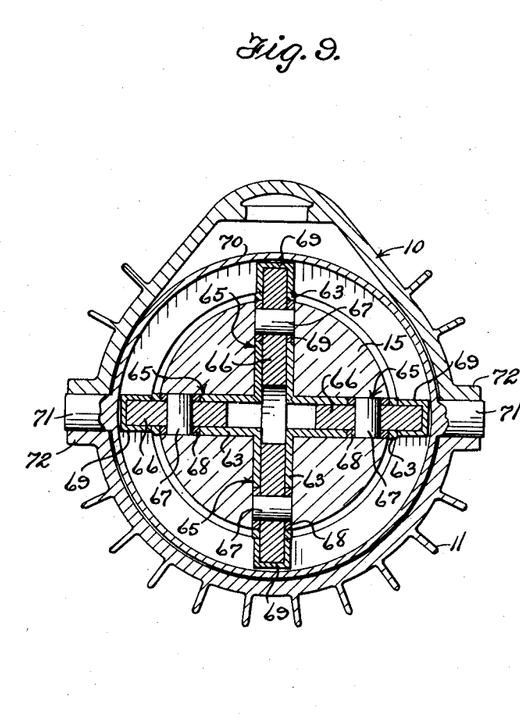
Figure 9 is a section on line 9—9 of Figure 2.
Figures 10, 11, 12, 13, 14, 15, 16, 17, 18, 19, 20:
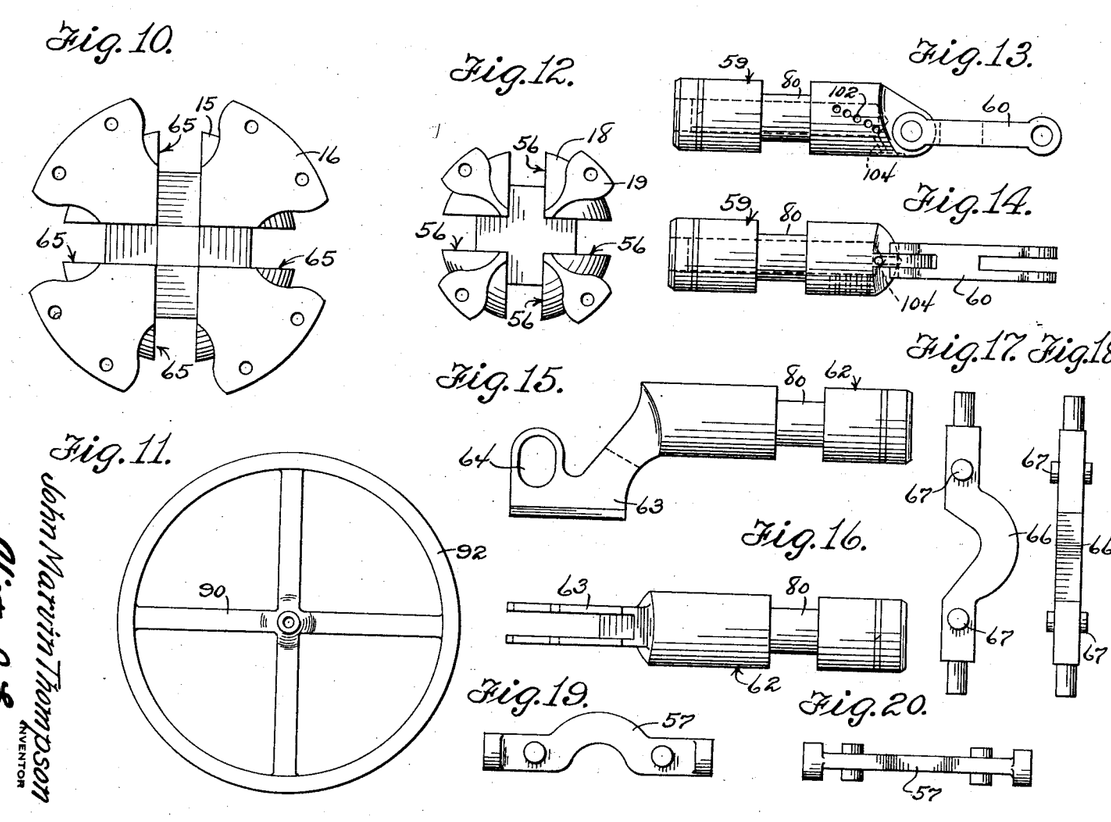
Figure 10 is an end view of the spherical member which is connected with the driven shaft.
Figure 11 is a view of the spider which is connected with the reversing valve stem.
Figure 12 is a view of the spherical member connected with the forward end of the cylinder housing.
Figures 13 and 14 are views of one of the pump pistons.
Figures 15 and 16 are views of one of the motor pistons.
Figures 17 and 18 are views of one of the power bars connected with the motor pistons.
Figures 19 and 20 are views of one of the bars connected with the pump pistons.

As before stated, when the ring member 36 is in a position where its groove 55 is in a plane at right angles to the drive shaft 12, the pistons 59 will not be reciprocated so that the drive shaft and the parts attached thereto can rotate without imparting movement to the driven shaft 13 and the parts attached thereto. When movement of the driven shaft is desired, the rack 51 is moved to cause the gear 49 to rotate the ring gear 46 so as to move the sleeve 42 longitudinally and this movement of the sleeve will cause the teeth of the rack 40 of sleeve 38, which of course moves with the sleeve 42, to move the ring member 36 to a position where the groove 55 will be placed in an inclined position so that the rotary movement of the member 36, by the drive shaft 12, will cause a rocking movement of the bars 57, which in turn causes the pistons 59 to reciprocate. As each piston 59 moves forwardly or away from the closed end of its cylinder, the inner end of the passage 34 is placed in communication with the annular chamber formed by the reduced part 80 of the piston so that fluid will pass from the pump chamber 23 into said space and from this space, the fluid will flow through a passage 83 into the closed end of an adjacent cylinder 35. The movement of the piston in this adjacent cylinder toward the closed end of its cylinder, will compress the fluid and force it back through the passage 83 into the annular space of the first cylinder, which at this time is in communication with a port 82, due to the movement of the piston in said first cylinder so that the compressed fluid will enter the small cylinder 81. The compressed fluid in the small cylinder 81 will flow through the passages 85 or the passages 86, according to the position of the valves 88 and 89. The fluid entering each power cylinder 61 from the compression cylinder 81, will enter the annular space formed by the reduced part of the piston and then flow through a passage 84 to the closed end of an adjacent cylinder 61, where it will act against the piston in said adjacent cylinder and force the same outwardly. Thus the fluid compressed by the pumping pistons 59 in the cylinders 35 will produce movement of the pistons 62 in the cylinders 61 and the reciprocatory movement of these pistons 62 will cause rotary movement of the shaft 13, the spherical member 15, the cylinder housing 17 and the spherical member 18 through the pressure exerted by the rocking movement of the bars 66 on the ring 70. As before explained, when the sleeve 42 is adjusted through the manual means, including the rack 51, the ring 70 is also adjusted. When the fluid from the pumping cylinders is delivered to the motor cylinders through the ports 86 the driven shaft will be rotated in a forward direction, but when the fluid is delivered through the ports or passages 85, the driven shaft is rotated in a reverse direction, due to the fact that the fluid entering through the passages 86 will act on the pistons 62 in a different sequence from what it does when it enters through the passages 85. Thus when the fluid enters through the passages 85, the movements of the pistons 62 will cause the bars 66 to act against the ring 70 in a different order or sequence so that the shaft is driven in a reverse direction. When the fluid enters through either the passages 85 or 86, the fluid from the cylinders 61 will return through the other passages and pass back to the small cylinder 81 beyond the valves on the stem 87 and thus return to the main housing 10. As the sleeve 42 is further advanced, to increase the tilt of the member 36 and thus increase the strokes of the pump cylinders 59, the member 70 is finally moved to a position at right angles to the driven shaft, which locks the piston 62 against reciprocatory movement and thus the fluid is trapped in the cylinders 35 so that the pistons 59 are prevented from reciprocating so that the parts are locked together and the driven shaft 13 will rotate at the same speed as the drive shaft 12. The intermediate positions of the ring members 36 and 70 will enable the driven member to be driven from the drive member at any ratio approximately from 1 to 100 and a constant speed increase may be had until a direct drive is obtained when the member 70 has been moved to a position at right angles to the driven shaft. As before explained, by moving the lever 98 to the position it occupies in Figure 1, the valves 88 and 89 are adjusted to cause the fluid to act on the pistons 62 to give a reverse movement to the driven shaft. On the member 70 is a lug 99 to engage the arm 94. With the arm 94 in the position shown in Figure 2 of the drawings the parts may be moved to full speed position but engagement of lug 99 with said arm 94 prevents the parts being moved into the position of a super-high speed. With the arm 94 in the position shown in Figure 3 of the drawings the parts may be moved into the super-high position. The arm 97 has a flexible connection with the link 94', as shown at 97', to prevent damage to the parts if the lever 98 is shifted to reverse when the parts are in full speed position. The stem 87 and its valves can also be positioned relative to the passages 85 and 86 to relieve the pressure in the cylinder 81, so as to permit the driven shaft to rotate freely when the drive shaft and its parts are in a position to cause the pistons 59 to remain idle. This position is shown in Figure 2.

The device will also act as a brake for the driven shaft 13, for if said shaft is rotating through momentum, for instance, faster than the drive shaft, the pistons 62 will tend to reciprocate and thus cause these pistons to operate as a pump to pump the fluid back to the cylinders 35 and thereby check the movement of the driven member. As will be seen, the increased strokes of the pumping pistons 59 decreases the strokes of the motor pistons 62 and when these motor pistons 62 are at zero, as shown in Figure 2, the pump pistons 59 are held against movement, thus creating a direct drive.

The device can be caused to have a forward speed of shaft 13 higher than that of shaft 12 and this is permitted when the ring member 17 is moved beyond vertical.

The pistons 59 are of hollow construction and are each provided with a diagonally arranged row of ports 102 and a passage 104 which will permit fluid to enter the interior of the pistons and in this manner a balancing effect is had under a direct drive.

Figure 1:
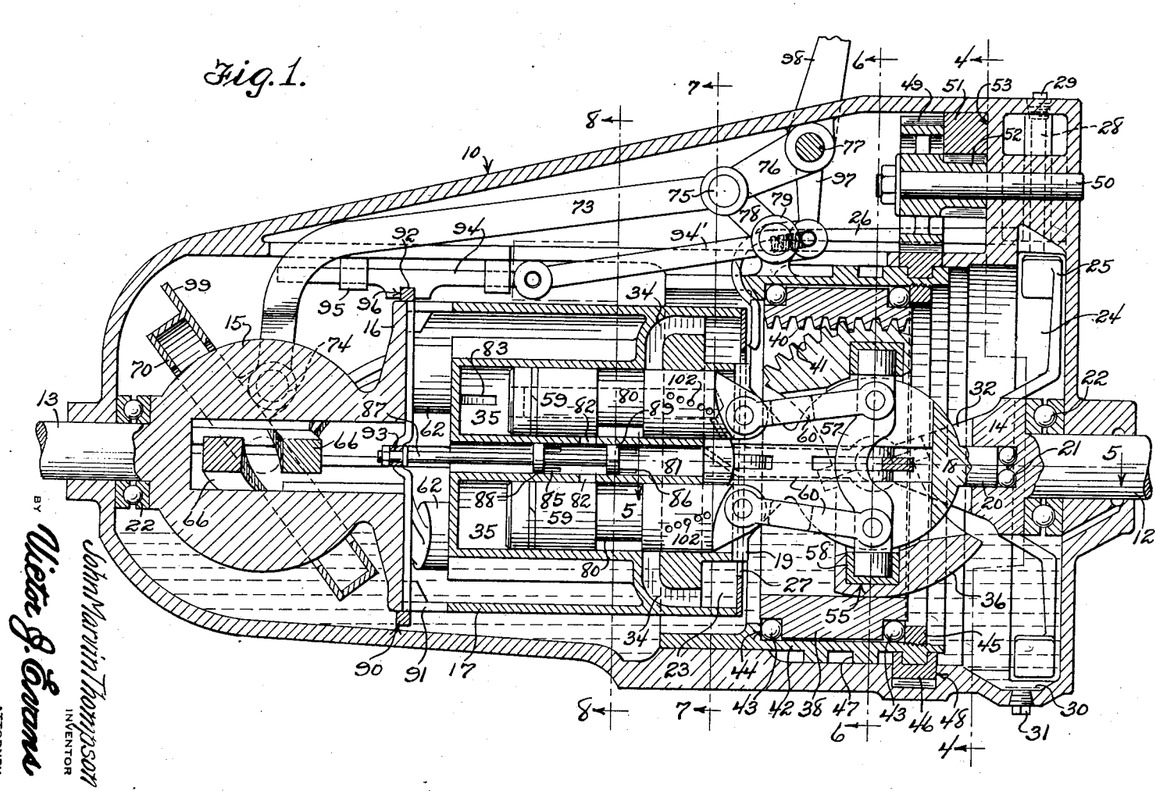
Figure 1 is a longitudinal sectional view through the apparatus, with the parts in a neutral position.
Figure 22:
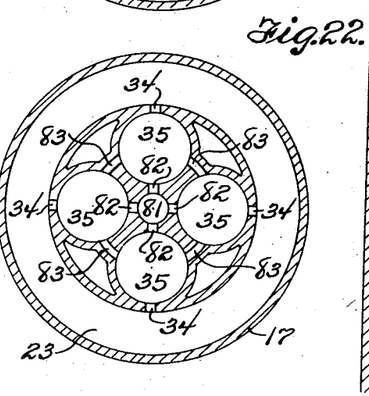
Figure 22 is a sectional diagrammatic view showing the ports leading to and from the pump cylinders.
Figure 23:
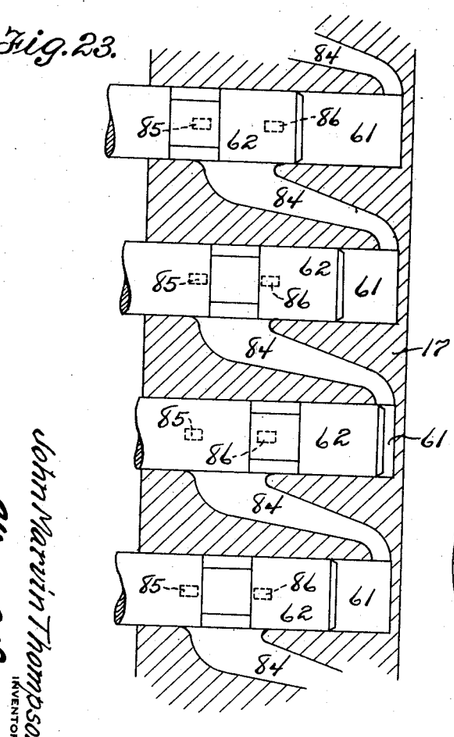
Figure 23 is a diagrammatic view of the motor cylinders and pistons.
Figure 24:
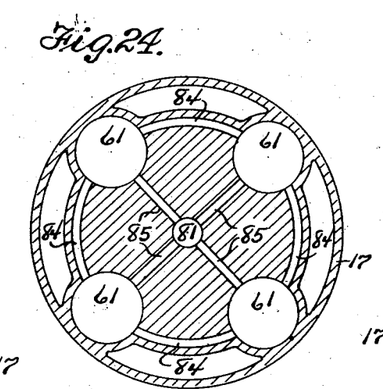
Figure 24 is a sectional diagrammatic view showing the ports leading to and from the motor cylinders.

As shown in the diagrammatic views in Figures 21 and 22, the pistons 59 control the ports 34 and 82 and said pistons, when in a neutral position, as shown in Figure 1, close all the ports 34 as well as the ports 82, and the pistons 62 and thus the shaft 13 are locked against movement and no fluid can enter or leave the cylinders. The motor pistons 62 control the ports 85 and 86.

A sight gauge 103 is provided for indicating the level of fluid in the housing 10.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. Transmission means of the class described comprising a housing containing fluid, a driven member extending into one end of the housing, a drive member extending into the opposite end thereof, a set of pump cylinders carried by the driven member within the housing, a set of motor cylinders carried by the driven member, pistons in said cylinders, cross rods connected with the motor pistons, a tiltable member engaged by the ends of the cross rods whereby the reciprocatory action of the motor pistons, causing the ends of the rods to bear against said tiltable member, will rotate the driven member. a second tiltable member in the housing and rotated from the drive member, cross bars engaging portions of the second tiltable member, one tiltable member being supported by the drive member and the other by the housing, means for connecting said second named cross rods with the pump pistons, manually operated means for adjusting the second tiltable member to regulate the strokes of the pump pistons through the action of the rotating tiltable member on the cross rods or to move said member to a position where the cross rods remain idle and the pump pistons do not reciprocate, means whereby the fluid compressed by the pump pistons is conveyed to the motor cylinders to operate the pistons therein, means for adjusting the first tiltable member by the adjusting means for the second tiltable member and means for conveying the fluid in the housing to the pump cylinders, such means being actuated by the drive member.

2. Transmission means of the class described comprising a housing containing fluid, a driven member extending into one end of the housing, a drive member extending into the opposite end thereof, a set of pump cylinders carried by the driven member within the housing, a set of motor cylinders carried by the driven member, pistons in said cylinders, cross rods connected with the motor pistons, a tiltable member engaged by the ends of the cross rods whereby the reciprocatory action of the motor pistons, causing the ends of the rods to bear against said tiltable member, will rotate the driven member, a second tiltable member in the housing and rotated from the drive member, cross bars engaging portions of the second tiltable member, one tiltable member being supported by the drive member and the other by the housing, means for connecting said second named cross rods with the pump piston, manually operated means for adjusting the second tiltable member to regulate the strokes of the pump pistons through the action of the rotating tiltable member on the cross rods or to move said member to a position where the cross rods remain idle and the pump pistons do not reciprocate, means whereby the fluid compressed by the pump pistons is conveyed to the motor cylinders to operate the pistons therein, means for adjusting the first tiltable member by the adjusting means for the second tiltable member, means for conveying the fluid in the housing to the pump cylinders, such means being actuated by the drive member and means for changing the direction of flow of the fluid from the pump cylinders to the motor cylinders to reverse the movement of the driven member.

3. Transmission means of the class described comprising a housing containing fluid, a drive member extending into one end of the housing, a driven member extending into the other end thereof, a set of motor cylinders carried by the driven member and arranged within the housing, a set of pump cylinders carried by the driven member and arranged within the housing, pistons in said cylinders, a tiltable member in the housing, means whereby the motor pistons will exert pressure against the tiltable member to cause rotary movement of the driven member, a second tiltable member in the housing rotated by the drive member, one tiltable member being supported by the drive member and the other by the housing, means for reciprocating the pump pistons by the rotary movement of said second tiltable member when the same is in tilted position, said second tiltable member, when in a certain position, causing the pistons to remain idle and the first tiltable member, when in a certain position, causing the motor pistons to remain idle, manually operated means for adjusting the second tiltable member, means associated with such means for adjusting the first tiltable member, but to a less extent than the first member, means for conveying the fluid compressed by the pump pistons to the motor cylinders, pump means operated by the drive member for conveying fluid to the pump cylinders, manually operated means for controlling the passage of fluid from the pump cylinders to the motor cylinders to cause the driven member to be rotated in either direction and means for preventing the driven member from being driven at direct speed in a reverse direction.

4. Transmission means of the class described comprising a housing, a drive member extending into one end thereof, a driven member extending into the other end thereof, a spherical member connected with the driven member and having slots therein arranged at right angles to each other, a cylinder housing having one end connected with the spherical member, a second spherical member connected with the other end of the cylinder housing and having slots therein arranged at right angles to each other, a tiltable member surrounding each spherical member and having an annular groove therein, cross bars passing through the slots of each spherical member with their ends engaging the groove of the adjacent tiltable member, one tiltable member being supported by the drive member and the other by the housing, a number of motor cylinders in the cylinder housing, pistons therein, means for connecting the pistons with the cross bars in the first spherical member, a number of pump cylinders in the cylinder housing, pistons therein, means for connecting the said pistons to the cross bars in the second spherical member, means for introducing fluid into the pump cylinders, means for conveying the fluid compressed in the pump cylinders to the motor cylinders to operate the pistons thereof, manually operated means for adjusting the tiltable member which is rotated by the drive member and means for communicating this movement to the tiltable member which surrounds the first spherical member but in an opposite direction and to a less extent.

5. Transmission means of the class described comprising a housing, a drive member extending into one end thereof, a driven member extending into the other end thereof, a spherical member connected with the driven member and having slots therein arranged at right angles to each other, a cylinder housing having one end connected with the spherical member, a second spherical member connected with the other end of the cylinder housing and having slots therein arranged at right angles to each other, a tiltable member surrounding each spherical member and having an annular groove therein, cross bars passing through the slots of each spherical member with their ends engaging the groove of the adjacent tiltable member, one tiltable member being supported by the drive member and the other by the housing, a number of motor cylinders in the cylinder housing, pistons therein, means for connecting the pistons with the cross bars in the first spherical member, a number of pump cylinders in the cylinder housing, pistons therein, means for connecting the said pistons to the cross bars in the second spherical member, means for introducing fluid into the pump cylinders, means for conveying the fluid compressed in the pump cylinders to the motor cylinders to operate the pistons thereof, manually operated means for adjusting the tiltable member which is rotated by the drive member, means for communicating this movement to the tiltable member which surrounds the first spherical member but in an opposite direction and to a less extent and manually operated means for reversing the movement of the driven member.

6. Transmission means of the class described comprising a housing, a drive member extending into one end thereof, a driven member extending into the other end thereof, means for introducing fluid into the housing, a spherical member connected with the driven member and having slots therein arranged at right angles to each other, a cylinder housing having one end connected with the spherical member and having openings therein placing the same in communication with the first housing, a second spherical member connected with the other end of the cylinder housing and having slots therein arranged at right angles to each other, a tiltable ring member supported for rocking movement in the first housing and surrounding the first spherical member, an annular groove in said ring member, a second ring member having an annular groove therein surrounding the second spherical member, means for rotating the second ring member from the drive member, a number of pump cylinders in the cylinder housing, pistons therein, cross rods passing through the slots of each spherical member and having their ends engaging the annular groove of the adjacent ring member, means for connecting the pump pistons to the cross rods passing through the second spherical member, a number of motor cylinders carried by the cylinder housing, pistons therein, means for connecting the pistons with the cross rods which pass through the first spherical member, pump means rotated from the drive member for conveying fluid from the main housing into the pump cylinders, means including a reverse cylinder for conveying the fluid compressed in the pump cylinders to the motor cylinders, manually operated valve means associated with the reverse cylinder for causing the fluid to act on the motor pistons to drive the driven member in one direction or the other, a sleeve slidably arranged in the main housing, manually operated means for adjusting the sleeve, means actuated by the sliding movement of the sleeve for adjusting the ring member which is connected with the drive member and means connected with the sleeve for adjusting the tiltable ring member which surrounds the first spherical member, but in an opposite direction from the first ring member and to a less extent.

In testimony whereof I affix my signature.

JOHN MARVIN THOMPSON.